US008084698B2

(12) United States Patent
Belton et al.

(10) Patent No.: US 8,084,698 B2
(45) Date of Patent: Dec. 27, 2011

(54) CURRENT LEADTHROUGH FOR CRYOSTAT

(75) Inventors: Neil John Belton, Didcot (GB); Martin Howard Hempstead, Ducklington (GB); Stephen Paul Trowell, Finstock (GB)

(73) Assignee: Siemens Plc, Frimley, Camberley (GB)

(*) Notice: Subject to any disclaimer, the term of this patent is extended or adjusted under 35 U.S.C. 154(b) by 544 days.

(21) Appl. No.: 12/262,608

(22) Filed: Oct. 31, 2008

(65) Prior Publication Data

US 2010/0038131 A1 Feb. 18, 2010

(30) Foreign Application Priority Data

Nov. 2, 2007 (GB) .................................. 0721556.9
Aug. 1, 2008 (GB) .................................. 0814086.5

(51) Int. Cl.
*H02G 3/18* (2006.01)

(52) U.S. Cl. .................. 174/650; 174/50.52; 174/50.59; 439/926

(58) Field of Classification Search .................. 174/650, 174/50.52, 50.59, 50.63, 152 GM; 439/926, 439/935, 282
See application file for complete search history.

(56) References Cited

U.S. PATENT DOCUMENTS

| | | | | |
|---|---|---|---|---|
| 4,519,662 | A | 5/1985 | Riley et al. | |
| 4,841,101 | A | 6/1989 | Pollock | |
| 5,223,672 | A | 6/1993 | Pinneo et al. | |
| 6,809,259 | B2 * | 10/2004 | Sridhar et al. | 174/50.5 |

FOREIGN PATENT DOCUMENTS

| | | | |
|---|---|---|---|
| GB | 2 408 636 | A | 6/2005 |

OTHER PUBLICATIONS

Combined Search and Examination Report dated Nov. 17, 2008 (five (5) pages).

* cited by examiner

*Primary Examiner* — Dhirubhai R Patel
(74) *Attorney, Agent, or Firm* — Crowell & Moring LLP

(57) ABSTRACT

A current lead-through for providing an electrically conductive path between an interior of a vessel and the exterior of the vessel. The electrically conductive path is electrically isolated from the material of the vessel. The current lead-through comprises an electrically conductive pin surrounded by an electrically isolating sealing material, and retained within a tubular carrier body by the sealing material, the electrically conductive pin being exposed at each end of the tubular carrier body to enable electrical connection thereto.

8 Claims, 7 Drawing Sheets

Prior Art

CURRENT LEADTHROUGH FOR CRYOSTAT

The present invention relates to cryostats including cryogen vessels for retaining cooled equipment such as superconductive magnet coils. In particular, the present invention relates to electrical connections between cooled equipment within a cryogen vessel and an external source of electricity.

BACKGROUND OF THE INVENTION

FIG. 1 shows a conventional arrangement of a cryostat including a cryogen vessel 12. A cooled superconducting magnet 10 is provided within cryogen vessel 12, itself retained within an outer vacuum chamber (OVC) 14. One or more thermal radiation shields 16 are provided in the vacuum space between the cryogen vessel 12 and the outer vacuum chamber 14. In some known arrangements, a refrigerator 17 is mounted in a refrigerator sock 15 located in a turret 18 provided for the purpose, towards the side of the cryostat. Alternatively, a refrigerator 17 may be located within access turret 19, which retains access neck (vent tube) 20 mounted at the top of the cryostat. The refrigerator 17 provides active refrigeration to cool cryogen gas within the cryogen vessel 12, in some arrangements by recondensing it into a liquid. The refrigerator 17 may also serve to cool the radiation shield 16. As illustrated in FIG. 1, the refrigerator 17 may be a two-stage refrigerator. A first cooling stage is thermally linked to the radiation shield 16, and provides cooling to a first temperature, typically in the region of 80-100K. A second cooling stage provides cooling of the cryogen gas to a much lower temperature, typically in the region of 4-10K.

A negative electrical connection to the magnet is usually provided to the magnet 10 through the body of the cryostat and a negative cable 21*a*. A positive electrical connection is usually provided by a positive cable 21 passing through the vent tube 20. In order to connect an external source of electricity to the positive cable 21, an electrical connection 22 must be provided through the wall of the turret outer assembly 32—and electrically insulated from the material of the cryogen vessel itself. Such electrical connections 22, commonly referred to as leadthroughs, are the subject of the present invention. The interior of the turret outer assembly 32 is exposed to the atmosphere of the cryogen vessel 12, typically helium in excess of atmospheric pressure.

The positive cable 21 must be electrically connected to an external source of electricity, yet the turret outer assembly must be sealed against cryogen leaks and air ingress. The leadthrough 22 is therefore required to provide electrical connection between the external source of electricity, and the positive cable 21 within the cryogen vessel. Such leadthrough must provide low resistance electrical continuity between the external source of electricity and the positive cable 21. It must provide a gas-tight seal to prevent cryogen gas in the cryogen vessel from escaping, and to prevent air ingress, through the seal. Helium is a commonly used cryogen, and the leadthrough must be made helium-tight if it is to be used in helium-cooled systems. The leadthrough must also provide electrical isolation between the material of the cryogen vessel and a conductive path between the positive cable and the external source of electricity. As mentioned above, it is common to use the body of the cryostat, including the material of the turret outer assembly 32, as the negative conductor to the magnet. The voltage applied to, or derived from, the magnet 10 will therefore appear across insulation provided as part of the leadthrough. In normal operation, such as introducing current into the magnet, or removing current from the magnet, the voltage across the magnet, and so across the insulation of the leadthrough, will be no more than about 20V. It is relatively simple to provide electrical isolation effective at such voltages. However, in the case of magnet quenches, where a superconductive magnet suddenly becomes resistive, large voltages may be developed across the coils of the magnet. In such circumstances, voltages reaching about 5 kV may appear across the insulation of the leadthrough. In any such leadthrough it is therefore necessary to provide electrical isolation sufficient to withstand an applied voltage of several kilovolts. Furthermore, during filling of the cryogen vessel with liquid cryogen, or in the case of liquid or boiling cryogen being expelled from the cryostat during a quench event, parts of the leadthrough exposed to the interior of the cryogen vessel may be cooled to a temperature of about 4.2K, the boiling point of helium. At the same time, parts of the leadthrough exposed to ambient temperature may be at 300K or more. Any leadthrough must therefore be able to withstand temperature differences of over 300K without deterioration.

FIGS. 2A and 2B show a known leadthrough as currently used to carry electricity into a cryogen vessel, in schematic cross-section, and in schematic perspective cross-section. A leadthrough conductor 30 is electrically isolated from a wall of the turret outer assembly 32 by a ceramic seal 34. An outer stainless steel fitting 36 seals against the leadthrough conductor 30 and the ceramic seal 34, retaining the ceramic seal in position, spaced concentrically away from the conductor 30. An inner stainless steel seal 38 seals against the ceramic seal 34 and extends radially away from the conductor 30 to provide a rim 40, radially spaced away from the conductor 30. In use, the leadthrough is welded by rim 40 to the turret outer housing 32. By having rim 40 spaced away from conductor 30, the risk of short circuiting the conductor to the rim during welding is reduced. The thermal distance between the weld location at rim 40 and the ceramic seal 34 needs to be sufficient to avoid thermal damage to the ceramic seal. Current lead 21, shown as a flexible metal laminate in the drawings, may be attached to the inner end of conductor 30 by any suitable fixing, such as a simple through-hole 41 and nut 58 on a threaded end 56 of conductor 30 as shown.

Generally, such arrangement has been found to provide satisfactory electrical performance and satisfactory sealing. On the other hand, such ceramic seals 34 have been known to fracture due to mechanical or thermal stress. Fracture of the ceramic seal may lead to contamination of the cryogen vessel with ceramic particles, a leak of cryogen gas to atmosphere, or ingress of air into the cryogen vessel. In a recent development, leadthroughs such as shown in FIGS. 2A, 2B are provided with an external support structure, which acts to mitigate some of the effects of fracture of the ceramic seal, but does not address the inherent mechanical weakness of the existing leadthrough.

Ceramic seals such as currently used in leadthroughs such as shown in FIGS. 2A and 2B cost about GB£200 (about US$400).

If a ceramic seal 34 such as shown in FIGS. 2A, 2B should break, it is necessary to cut the weld between rim 40 and wall 32, to clean out any contamination of the cryogen vessel and replace the leadthrough, including welding the rim 40 of the new leadthrough to the wall 32. Such operation has been known to cost in the region of £2500 (US $5000). If failure of the ceramic seal at a customer site causes return of the cooled equipment and cryostat, much higher costs may be anticipated.

It is an object of the present invention to provide a leadthrough suitable for providing electrical connection between a current lead within a cryogen vessel and an external source of electricity, which is gas-tight, which are not susceptible to fracture due to mechanical or thermal stress, which provides a significant cost saving over the currently available leadthroughs which use ceramic seals, and preferably which is simple to install and replace.

SUMMARY OF THE INVENTION

Accordingly, the present invention provides a current lead-through for providing an electrically conductive path between an interior of a vessel and the exterior of the vessel. The electrically conductive path is electrically isolated from the material of the vessel. The current lead-through comprises an electrically conductive pin surrounded by an electrically isolating sealing material, and retained within a tubular carrier body by the sealing material, the electrically conductive pin being exposed at each end of the tubular carrier body to enable electrical connection thereto.

Other objects, advantages and novel features of the present invention will become apparent from the following detailed description of the invention when considered in conjunction with the accompanying drawings.

DETAILED DESCRIPTION OF THE DRAWINGS

Figure 3A:
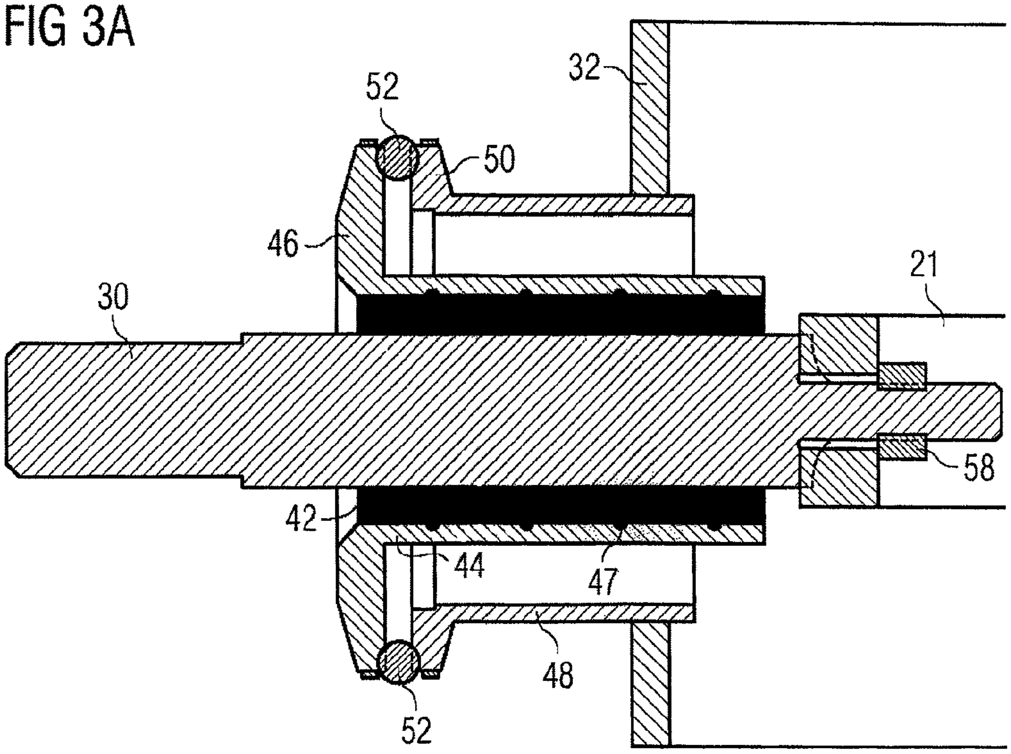
FIGS. 3A and 3B each show a schematic cross-section of a leadthrough according to an embodiment of the present invention.
Figure 5:
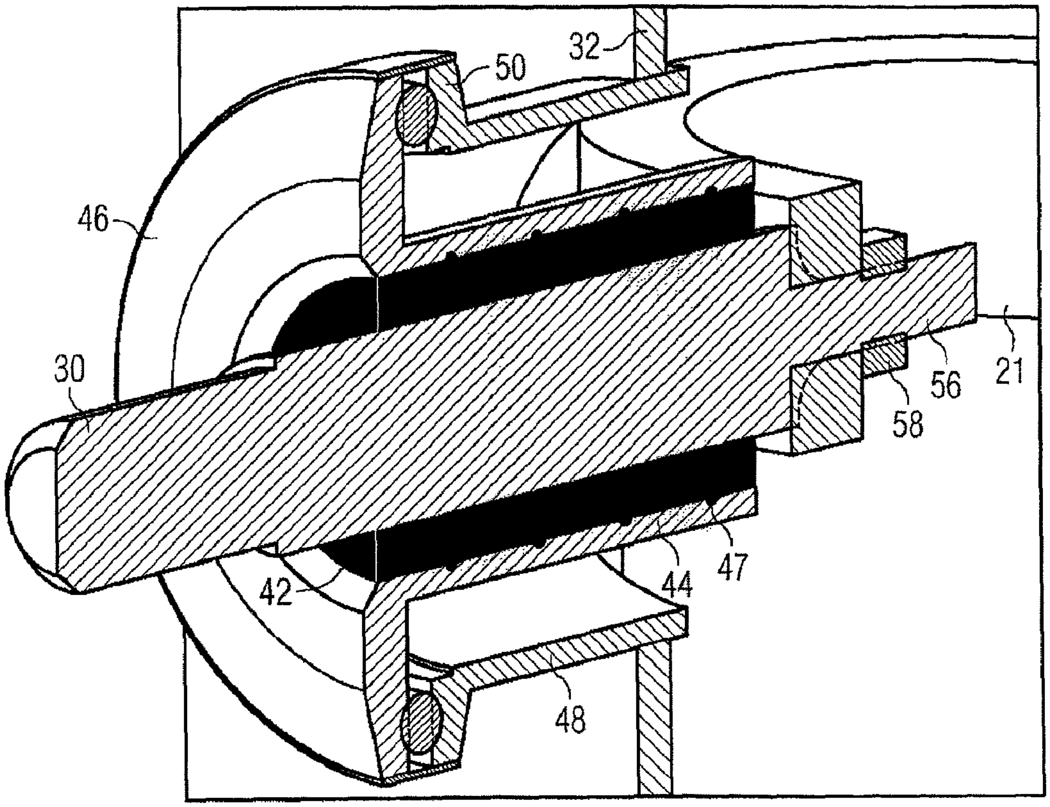
FIG. 5 shows a schematic perspective cross-section of a leadthrough according to an embodiment of the present invention.

FIGS. 3A and 5 illustrate a schematic cross-sectional view and a schematic perspective cross-sectional view of a leadthrough according to the present invention. An electrically conductive pin 30 is surrounded by an electrically isolating sealing material 42, and is retained within a mechanically robust tubular carrier body 44 by the sealing material 42. A radially extending flange 46 is provided at or near an outer extremity of the carrier body 44. A stainless steel port 48 is preferably provided in the wall 32 and has a mating flange 50. Flanges 48 and 50 may be welded together 52 to retain the leadthrough in position and to provide a gas tight seal. The radially extending flange 46 ensures that the weld 52 is sufficiently distant from the sealing material 42 that no damage is caused by the heat of welding. In a preferred embodiment, the electrically conductive pin 30 is of copper, the carrier body 44 is of stainless steel, and the sealing material 42 is of an epoxy resin or epoxy putty. A fibrous reinforcement material such as glass fibre may be provided within the epoxy resin or epoxy putty. A preferred material is Araldite® AV1580 epoxy putty. Current lead 21, shown as a flexible metal laminate in the drawings, may be attached to the inner end of conductor 30 by any suitable fixing, such as a simple through-hole and nut 58 as shown.

Figure 3B:
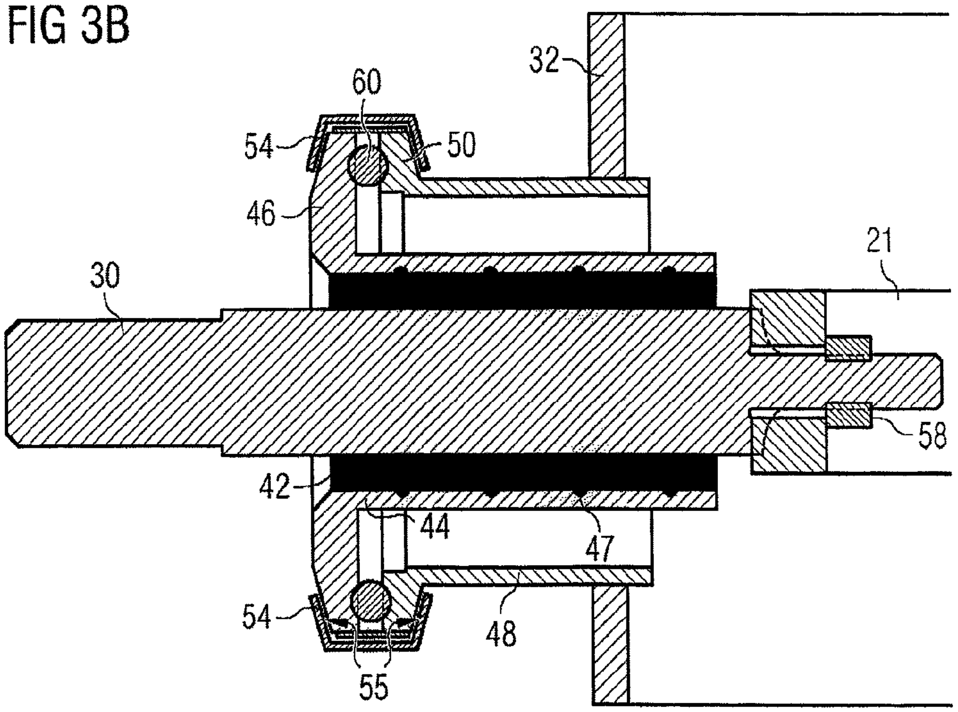
Figure 4:
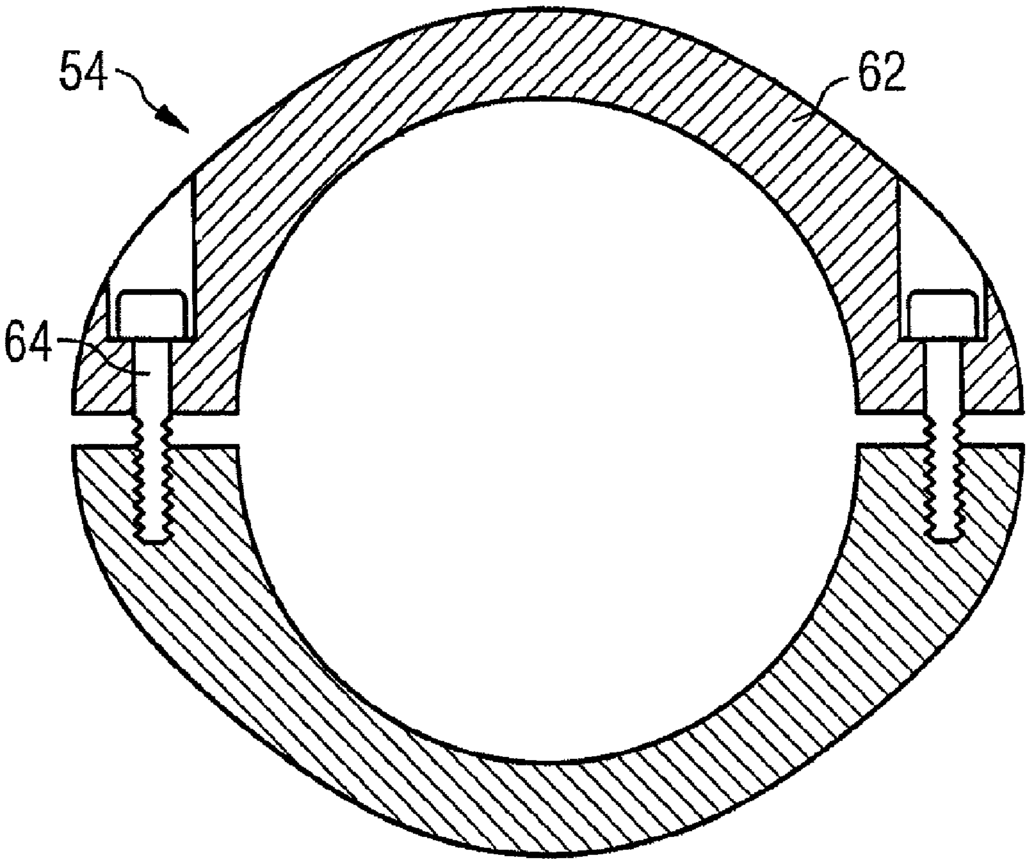
FIG. 4 shows a view of a clamp suitable for use in an embodiment of the present invention.

In alternative embodiments, as illustrated in FIG. 3B, the leadthrough may be held in place by a mechanical clamp 54 acting on the radially extending flange 46 of the carrier body 44 and the flange 50 of part 48. Preferably, as illustrated, at least one of the flanges 46, 50 is radially tapered, and clamp 54 has complementary acting surfaces 56, such that the tightening of clamp 54 causes flanges 46, 50 to be driven together. Preferably, and as illustrated, a seal 60 is placed between flanges 46, 50 to ensure an effective gas-tight seal. The clamp 54 may, as illustrated in FIG. 4, consist of two semi-circular profiles 62, drawn together by bolts 64. Alternative clamps may of course be used.

Such a leadthrough offers improved mechanical strength and durability over the known leadthrough, and is expected to cost approximately GB£35 (approximately US$70), considerably less than a comparable leadthrough of the prior art.

The leadthrough of FIGS. 3A, 3B and 5 may be constructed by the following method. The electrically conductive pin 30 may be produced by turning a copper rod of suitable dimensions. The carrier body 44 may be produced by spinning or die stamping a stainless steel tube of suitable dimensions. The electrically conductive pin 30 is retained in position with a jig, while epoxy putty 42 is introduced into the cylindrical gap between the conductive pin 30 and the carrier body 44. The carrier body 44 and epoxy resin are preferably then compressed to ensure effective filling and adhesion of the epoxy putty.

Figure 6:
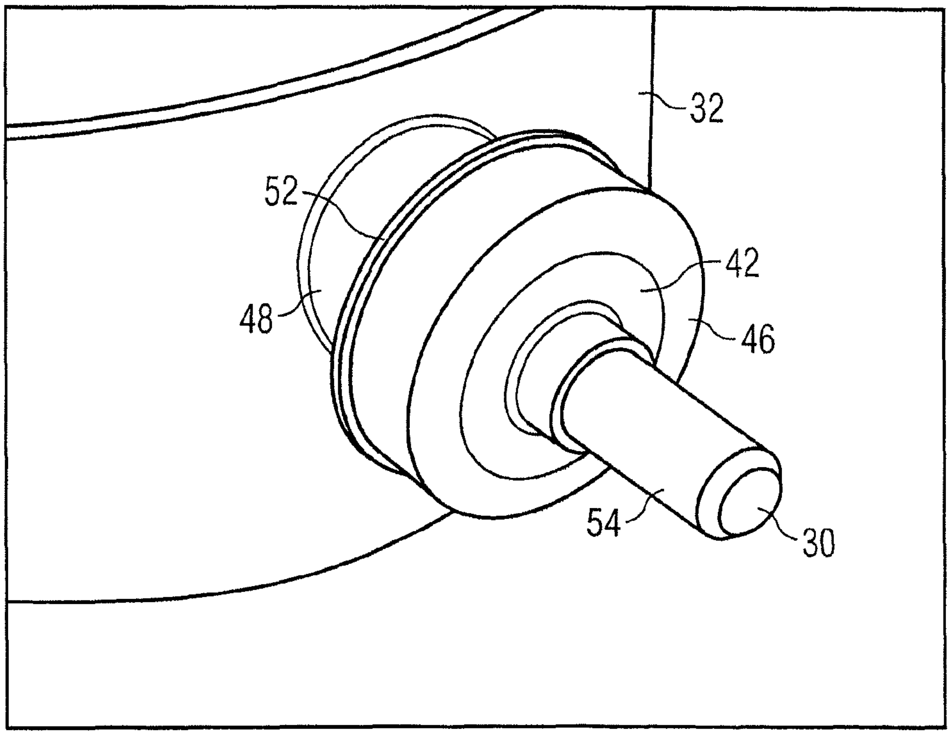
FIG. 6 shows a perspective view of a leadthrough of the present invention, as viewed from the exterior.
Figure 7:
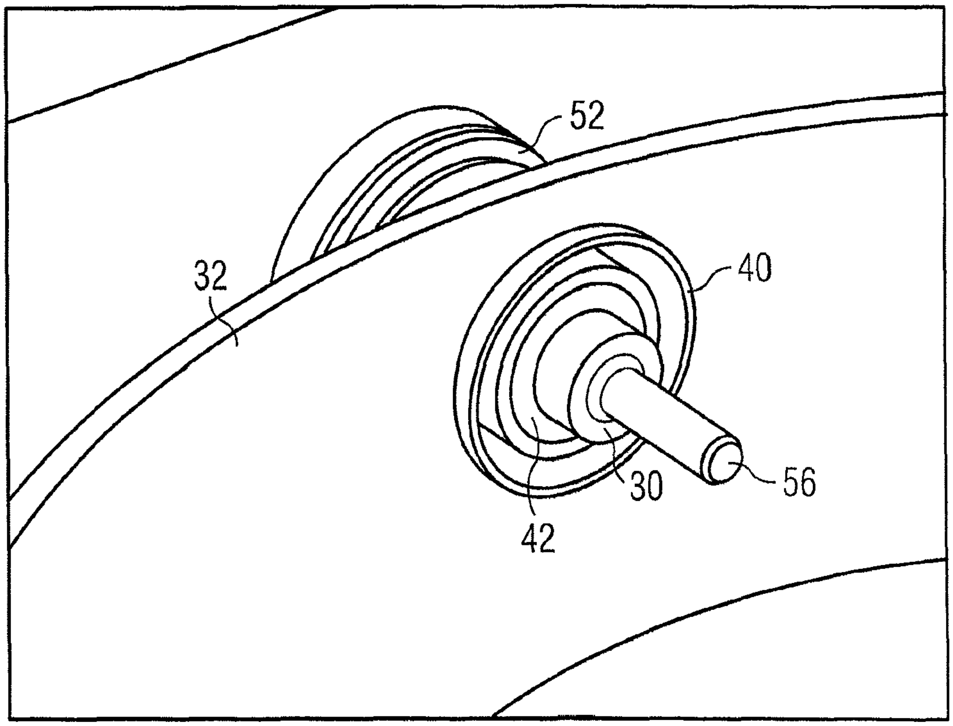
FIG. 7 shows a perspective view of a leadthrough of the present invention, as viewed from the interior of the cryostat.

FIGS. 6, 7 shows a perspective view of a leadthrough according to the present invention, installed through a wall 32, as viewed from the exterior (FIG. 6) and interior (FIG. 7) of the turret outer assembly. The conductive pin 30 is exposed at outer 54 and inner 56 portions to allow a conventional electrical connector to be joined. For example, a resilient split tubular connector of inner diameter slightly less than the external diameter of an outer exposed portion 54 of the conductive pin 30 may be pushed onto the outer exposed portion 54. Inner exposed portion 56 may be threaded, to enable connection of conductor 21, for example a copper laminate, by use of a simple nut 58. Such connections provide reliable, simple connections which may be repeatedly removed and reconnected. Sealing material 42 is clearly visible, extending coaxially around the conductive pin, retaining the pin in position within mechanically robust tubular carrier body 44. Protrusions, grooves 47 (FIG. 5) or other texturing may be applied to the inner surface of the robust tubular carrier body 44, to ensure that the sealing material 42 does not move in use. As can be seen in FIGS. 6, 7 the flange 46 of mechanically robust tubular carrier body 44 is sealed and attached to the wall 32 by welding 52. An adhesive bond could alternatively be used depending on the materials of the mechanically robust tubular carrier body 34 and the wall 19, or a clamp may be used, as illustrated in FIGS. 3B and 4.

Figure 8:
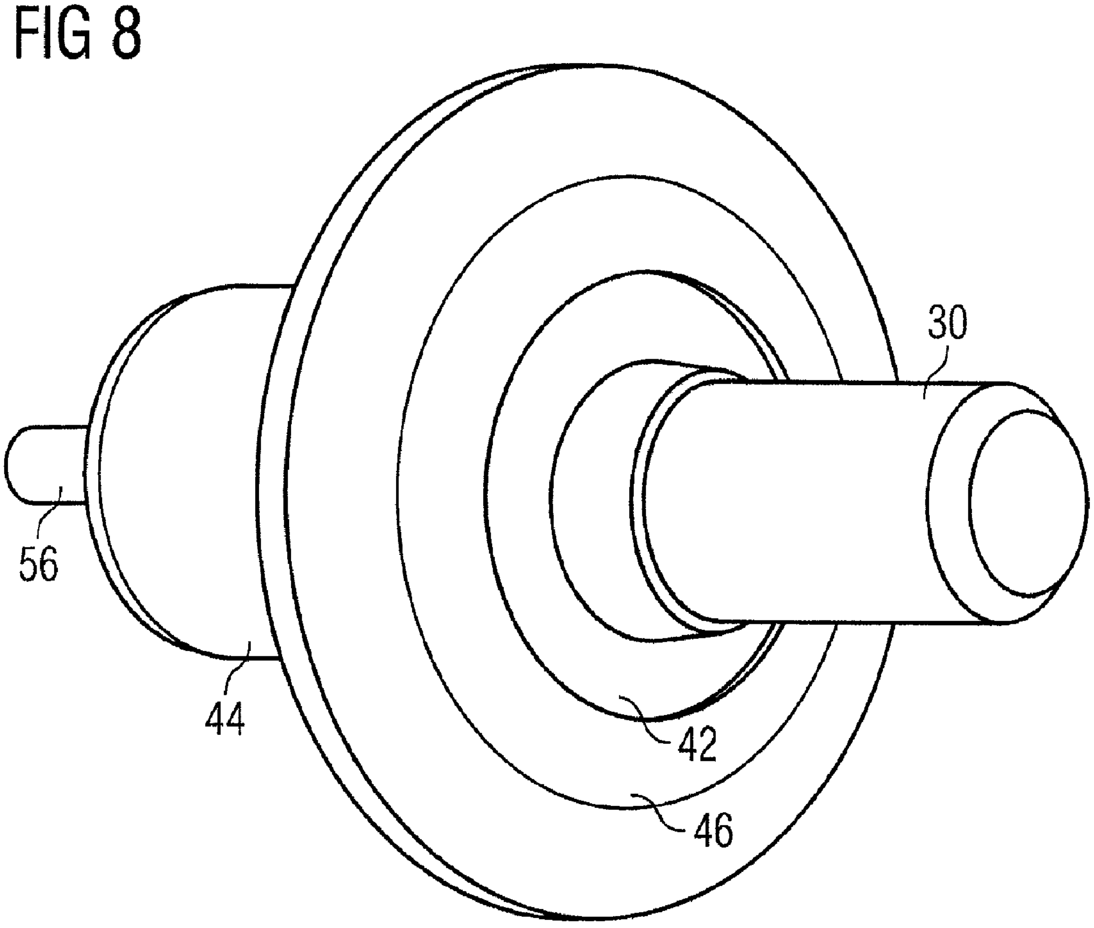
FIG. 8 shows a perspective view of a leadthrough of the present invention in isolation.

FIG. 8 shows a perspective view of a leadthrough of the present invention in isolation.

The present invention is not limited to the features of the described embodiment, particularly the features of the conductive pin 30 which enable electrical connections, and any of the many known equivalent arrangements may be used, such as plugs, sockets, spring clips, solder tabs, screw terminals and so on.

Similarly, while the carrier body 44 has been described as being of stainless steel, other materials may be used, such as copper, aluminium or suitable metal alloys. Alternatively, composite materials such as resin reinforced with fibrous material such as glass fibre or carbon fibre may be used (but could not be welded). While the sealing material 42 has been described as epoxy putty, other materials may be used, provided they are electrical insulators, and can withstand temperatures of 4K and a temperature differential of over 300K over the length of the leadthrough. Polymers such as PTFE or nylon may be suitable, and may be injection moulded into a space between conductor 30 and carrier body 44 to form the sealing material 40.

A useful leadthrough for present purposes must provide effective high-voltage isolation, which may be tested for in voltage breakdown tests. It must provide a gas-tight seal, which may be tested for by measuring a gas leak rate under a certain differential pressure. The leadthrough must provide low resistance electrical connection capable of carrying the required level of current yet provide electrical isolation to at least 5 kV. Since, in the described embodiment, the electrically conductive pin is formed of copper, with a diameter of about 12 mm and a length of about 80 mm, suitable electrical conductivity may be assumed.

It has been found important to ensure that water ingress into the sealing material is prevented, since water may cause electrical breakdown at relatively low voltages, and may compromise the mechanical robustness of the seal.

Figure 1:
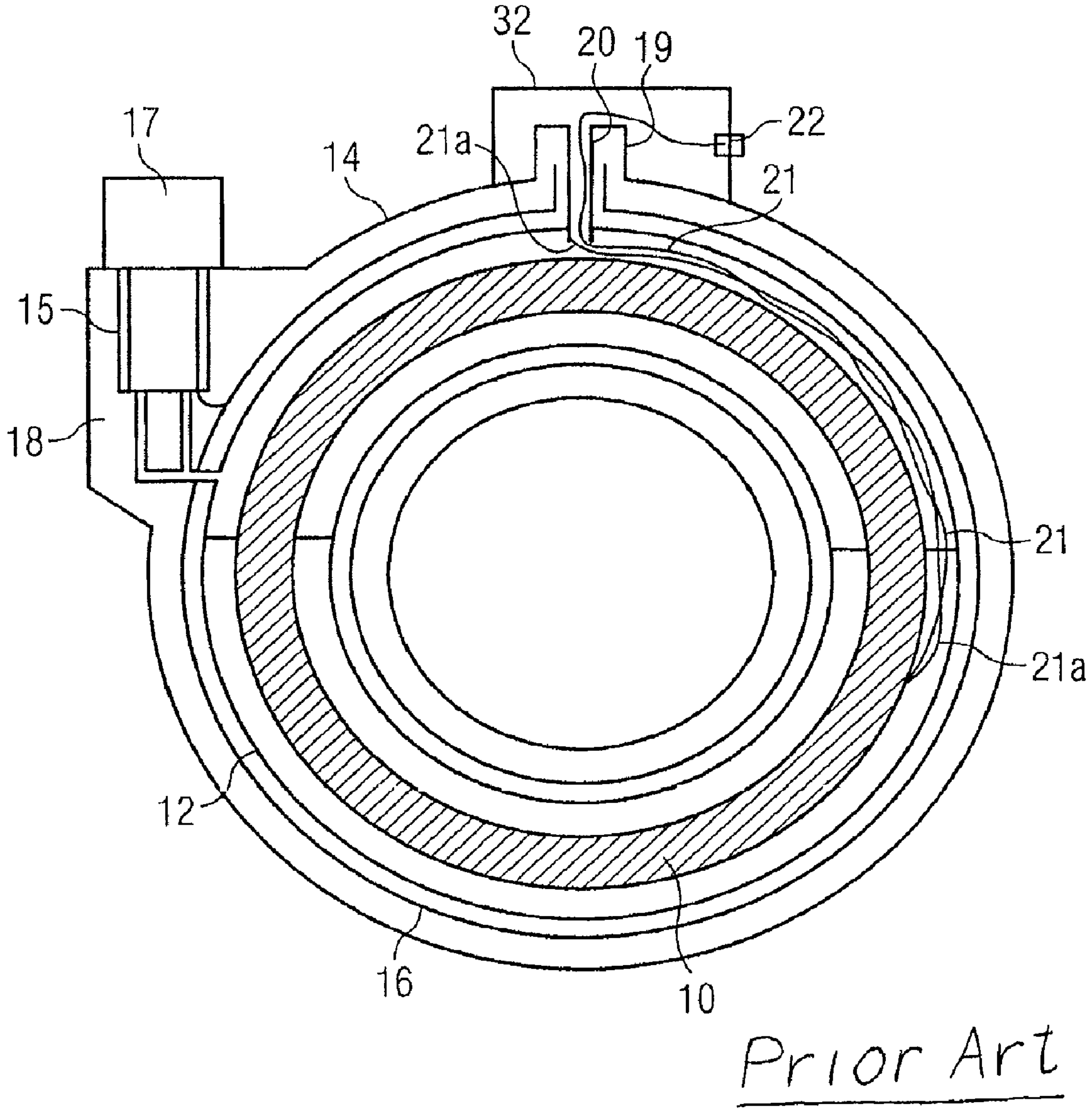
FIG. 1 shows a conventional cryostat containing cooled equipment, having a leadthrough providing electrical continuity to the cooled equipment from the exterior.
Figure 2A:
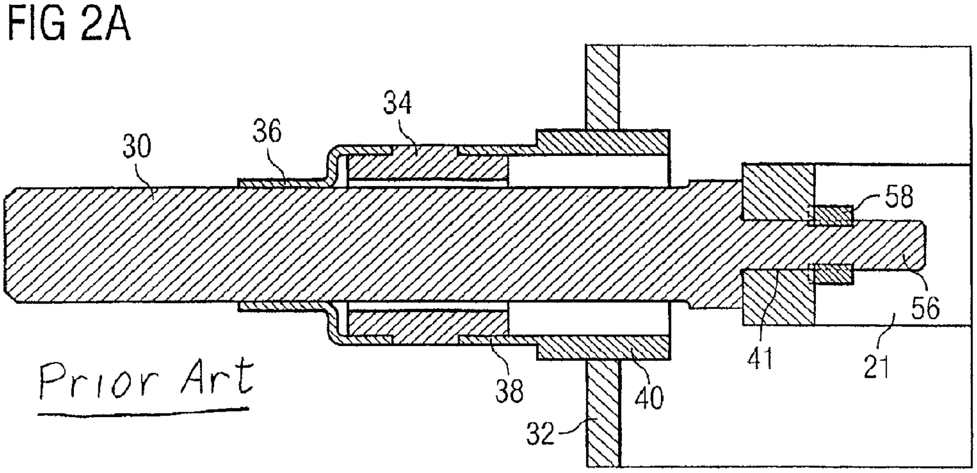
FIGS. 2A and 2B show a schematic cross-section, and a schematic perspective cross-section of a of a conventional leadthrough.
Figure 2B:
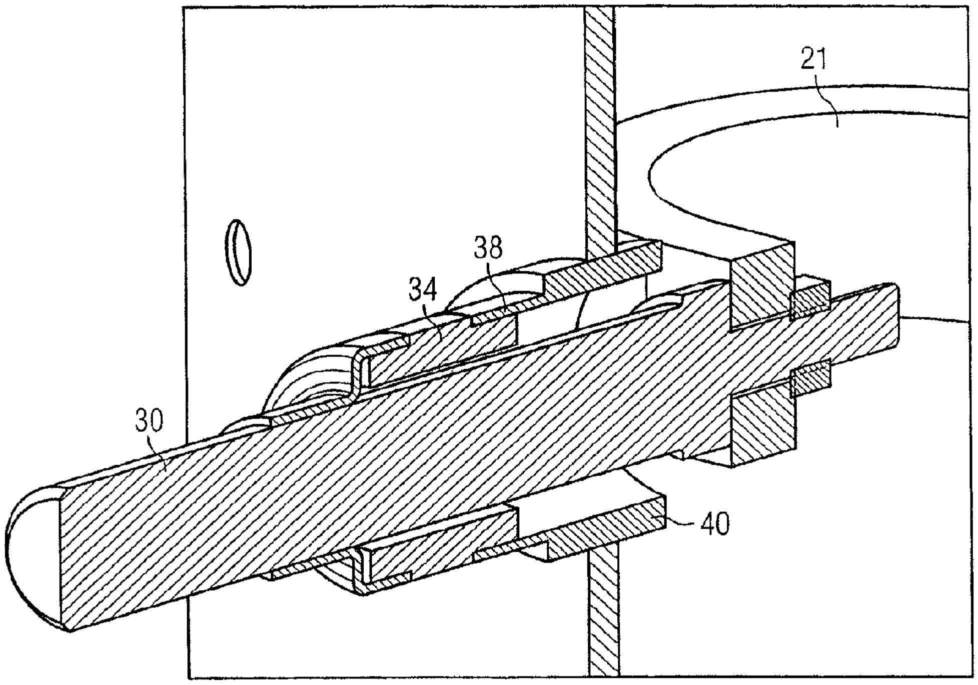

Results of performance tests on an embodiment of the present invention such as illustrated in FIG. 2, with an epoxy putty as the sealing material 32 are as follows:

| | |
|---|---|
| Room temperature electrical breakdown: | >5000 V |
| Average temperature reached during the weld process: | |
| Copper pin 30: | 306.9 K |
| Stainless steel carrier body 44: | 308.0 K |
| Room temperature electrical breakdown test (repeated after welding complete) | >5000 V |
| Initial vacuum leak rate at differential pressure of approximately 200 kPa | $1.88 \times 10^{-9}$ millibar · litres/sec |
| Perform shock cold test cycle (sudden drop in temperature from approx. 300 K to approx 4 K then retest vacuum leak rate at differential pressure of approximately 200 kPa) | $2.3 \times 10^{-9}$ millibar · litres/sec |
| Room temperature electrical breakdown test (repeated after cold test cycle) | >5000 V |
| Vacuum leak rate after 24 hours at vacuum then retest vacuum leak rate at differential pressure of approximately 200 kPa | $4.25 \times 10^{-9}$ millibar · litres/sec |

The current production minimum standard leak rate is $1.0 \times 10^{-3}$ millibar · litres/sec. As illustrated by the above test results, the current leadthrough of the present invention offers significantly better leak characteristics than this minimum performance value.

The current production minimum standard leak rate is $1.0 \times 10^{-3}$ millibar·liters/sec. As illustrated by the above test results, the current leadthrough of the present invention offers significantly better leak characteristics than this minimum performance value.

After these initial tests, some endurance tests were performed. Long term testing involved subjecting a leadthrough of the present invention to an electrical conductance test between conductor 30 and carrier body 44 at 1000V, with vacuum integrity testing at a differential pressure of approximately 200 kPa to quantify the sealing efficiency of the epoxy putty sealing material 42. Results showed no deterioration of the electrical performance, but some degradation of the sealing efficiency, in an increased vacuum leak rate over a timed period.

The sealing efficiency remained far superior to the minimum standard leak rate defined above.

| Time elapsed (days) | vacuum leak rate (millibar · litres/sec) | Electrical conductance at 1000 V |
|---|---|---|
| 0 | $1.20 \times 10^{-9}$ | 0 |
| 40 | $1.58 \times 10^{-9}$ | 0 |
| 92 | $2.85 \times 10^{-9}$ | 0 |

These results show that the electrical breakdown level of the insulation provided by the sealing material is initially satisfactory, and is not degraded by the welding operation, or a cold temperature cycle. The vacuum leak rate degraded somewhat following welding, and again following a cold temperature cycle. The vacuum leak rate was also found to degrade over time. The vacuum leak rate was however regarded as satisfactory. The above test results were obtained from testing a prototype device, and it is believed that better electrical isolation and a reduced vacuum leak rate will be achieved with production versions of the leadthrough of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vessel having a current lead-through that provides an electrically conductive path between an interior of the vessel and an exterior of the vessel; wherein:

said electrically conductive path is electrically isolated from material of the vessel;

the current lead-through comprises an electrically conductive pin that is surrounded by an electrically isolating sealing material, and is retained within a tubular carrier body by the sealing material;

the electrically conductive pin is exposed at each end of the tubular carrier body to enable electrical connection;

the tubular carrier body traverses a wall of the vessel, and is sealed and attached to the wall of the vessel; and the vessel is provided with a port having a first end sealed and attached to the wall of the vessel, and having a second end sealed and attached to the tubular carrier body of the current lead through.

2. The vessel according to claim 1, wherein:

the electrically conductive pin comprises copper;

the carrier body comprises stainless steel; and the sealing material comprises one of an epoxy resin and an epoxy putty.

3. The vessel according to claim 2, wherein a fibrous reinforcement material is provided within the epoxy resin or epoxy putty.

4. The vessel according to claim 1, wherein the second end of the port is sealed and attached to the tubular carrier body of the current leadthrough by welding.

5. The vessel according to claim 4, wherein a seal is placed between the radially extending flange and the mating flange.

6. The vessel according to claim 1, wherein the second end of the port is sealed and attached to the tubular carrier body of the current leadthrough by a clamp.

7. The vessel according to claim 6, wherein the tubular carrier body is provided with a radially extending flange, and the second end of the port is provided with a mating flange, and wherein the radially extending flange is sealed and attached to the mating flange.

8. The vessel according to claim 7, wherein:

one of the radially extending flange and the mating flange is radially tapered; and the clamp comprises an acting surface complementary to the tapered surface and an acting surface complementary to the corresponding surface of the other of the radially extending flange and the mating flange.

* * * * *